US012131849B2

(12) United States Patent
Min et al.

(10) Patent No.: US 12,131,849 B2
(45) Date of Patent: Oct. 29, 2024

(54) FAST ACTIVATION THERMAL FUSE FOR SHORT CIRCUIT CURRENT PROTECTION

(71) Applicant: Dongguan Littelfuse Electronics Company Limited, Dongguan (CN)

(72) Inventors: Long Min, Dongguan (CN); Libing Lu, Dongguan (CN); Dongjian Song, Dongguan (CN)

(73) Assignee: Dongguan Littelfuse Electronics Company Limited, Donggun (CN)

( * ) Notice: Subject to any disclaimer, the term of this patent is extended or adjusted under 35 U.S.C. 154(b) by 312 days.

(21) Appl. No.: 17/801,856

(22) PCT Filed: May 11, 2020

(86) PCT No.: PCT/CN2020/089639

§ 371 (c)(1),
(2) Date: Aug. 24, 2022

(87) PCT Pub. No.: WO2021/169046

PCT Pub. Date: Sep. 2, 2021

(65) Prior Publication Data

US 2023/0085845 A1 Mar. 23, 2023

(30) Foreign Application Priority Data

Feb. 27, 2020 (CN) ........................ 202020218035.3

(51) Int. Cl.
*H01C 7/12* (2006.01)

(52) U.S. Cl.
CPC .................................... *H01C 7/126* (2013.01)

(58) Field of Classification Search
CPC .......... H01C 7/126; H01C 7/102; H01C 7/12; H01H 37/761
See application file for complete search history.

(56) References Cited

U.S. PATENT DOCUMENTS

| | | | | |
|---|---|---|---|---|
| 6,430,019 | B1 * | 8/2002 | Martenson | H01C 7/126 361/103 |
| RE42,319 | E * | 5/2011 | Martenson | H02H 9/042 361/103 |
| 8,502,637 | B2 * | 8/2013 | Guarniere | H01C 7/10 338/21 |
| 9,537,304 | B2 * | 1/2017 | Mao | H02H 9/044 |
| 11,482,354 | B2 * | 10/2022 | Yang | H01C 7/12 |

(Continued)

FOREIGN PATENT DOCUMENTS

| | | | |
|---|---|---|---|
| CN | 101261893 | A | 9/2008 |
| CN | 103620703 | A | 3/2014 |

(Continued)

OTHER PUBLICATIONS

International Search Report and Written Opinion mailed Nov. 30, 2020 for International Application PCT/CN2020/089639 filed May 11, 2020.

*Primary Examiner* — Kyung S Lee
(74) *Attorney, Agent, or Firm* — KDW Firm PLLC

(57) ABSTRACT

A flat spring (100) is disclosed, for use in a surge protection device (SPD) such as a fast activation thermal fuse, to be integrated with a thermal metal oxide varistor (TMOV). The flat spring (100) has a V-shaped protrusion (110) to enable ultra-high short circuit current protection under overvoltage condition.

20 Claims, 11 Drawing Sheets

(56) References Cited

U.S. PATENT DOCUMENTS

| | | | | |
|---|---|---|---|---|
| 2009/0079535 | A1 * | 3/2009 | Jeong | H01C 7/126 338/21 |
| 2012/0068806 | A1 * | 3/2012 | Guarniere | H01C 7/108 361/91.1 |
| 2017/0110279 | A1 * | 4/2017 | Yang | H01H 37/761 |
| 2021/0005360 | A1 * | 1/2021 | Yang | H01H 9/0066 |

FOREIGN PATENT DOCUMENTS

| | | | | |
|---|---|---|---|---|
| CN | 203673907 | U | 6/2014 | |
| CN | 106026067 | | 10/2016 | |
| CN | 107946007 | A | 4/2018 | |
| CN | 108701570 | A | 10/2018 | |
| CN | 110349721 | A | 10/2019 | |
| CN | 212161427 | U | 12/2020 | |
| WO | WO-2013000796 | A2 * | 1/2013 | H01C 7/126 |

* cited by examiner

FAST ACTIVATION THERMAL FUSE FOR SHORT CIRCUIT CURRENT PROTECTION

BACKGROUND

Over-voltage protection devices are used to protect electronic circuits and components from damage due to over-voltage fault conditions. These over-voltage protection devices may include metal oxide varistors (MOVs) that are connected between the circuits to be protected and a ground line. MOVs have a specific current-voltage characteristic that allows them to be used to protect such circuits against catastrophic voltage surges. Typically, these devices utilize spring elements, which can melt during an abnormal condition to form an open circuit. In particular, when a voltage that is larger than the nominal or threshold voltage is applied to the device, current flows through the MOV, which generates heat. This causes the linking element to melt. Once the link melts, an open circuit is created, which prevents the MOV from catching fire.

When a circuit is facing very high short circuit current (like 50 A~200 kA) under overvoltage condition, normally a thermally protected MOV will be used to protect the entire circuit from catching fire. The thermal fuse, in series with the MOV, should form open circuit within very short time to disconnect the varistor from the power system. When an ultra-high overcurrent condition occurs, the thermal fuse may not be able to timely disconnect from the power supply due to overheating occurring too quickly.

SUMMARY

In various embodiments, a novel flat spring is disclosed, for use in a surge protection device (SPD) such as a fast activation thermal fuse, to be integrated with a thermal metal oxide varistor (TMOV). The novel flat spring has a V-shaped protrusion to enable ultra-high short circuit current protection under an overvoltage condition.

In one embodiment, a flat spring for use in a surge protection device (SPD) is disclosed, the flat spring comprising a first terminal comprising a substantially L-shape in a first plane, the first terminal comprising a first portion and a second portion, wherein the second portion is orthogonal to the first portion, a multi-part section coupled to the second portion of the first terminal, the multi-part section being orthogonal to the second portion and parallel to the first portion, the multi-part section further comprising a V-shaped protrusion having a first side, a second side, and a bottom region, the bottom region being at a first depth, and a solder-side terminal being at a second depth, wherein the first depth is lower than the second depth.

In one embodiment a surge protection device (SPD) is disclosed, comprising a metal oxide varistor (MOV) comprising a first terminal, a pair of springs, an arc shield to be disposed over the MOV, the arc shield to abut against the pair of springs when slid into a housing of the SPD, and a flat spring to be slid into the housing above the arc shield, the flat spring comprising a second terminal comprising a substantially L-shape in a first plane, a multi-part section coupled to the second terminal, the multi-part section further comprising a V-shaped protrusion having a first side, a second side, and a bottom region, the bottom region being at a first depth, and a solder-side terminal being at a second depth, wherein the first depth is lower than the second depth.

DETAILED DESCRIPTION

In various embodiments, a novel flat spring is disclosed, for use in a surge protection device (SPD) such as a fast activation thermal fuse, to be integrated with a thermal metal oxide varistor (TMOV). The novel flat spring has a V-shaped protrusion to enable ultra-high short circuit current protection under overvoltage conditions.

Figure 1:
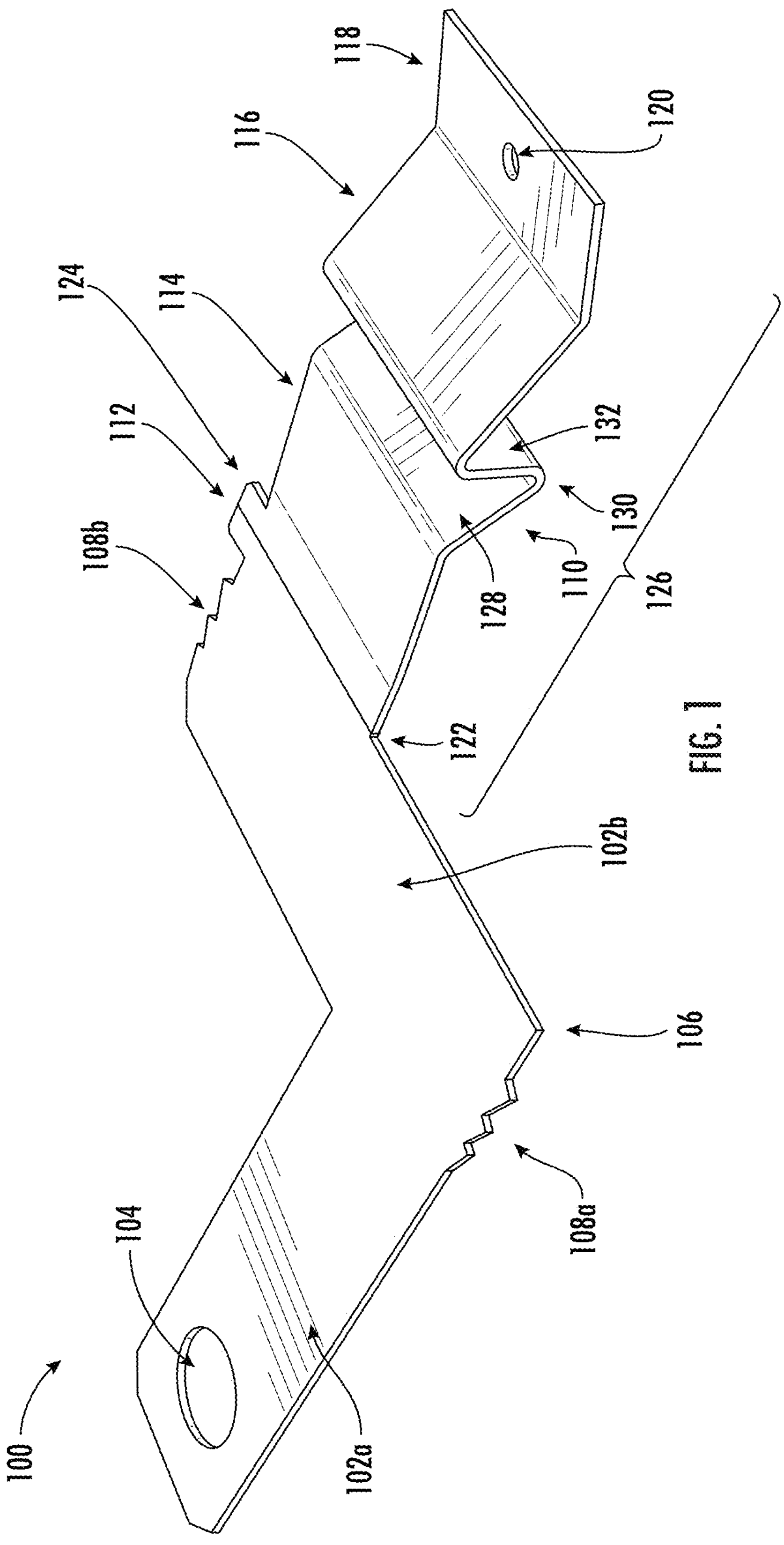
FIG. 1 is a diagram illustrating a flat spring with V-shaped protrusion for use in an SPD, in accordance with exemplary embodiments.

FIG. 1 is a representative drawings of a flat spring with a V-shaped protrusion 100, according to exemplary embodiments. The flat spring with V-shaped protrusion, referred to herein as a novel flat spring 100, is used in a surge protection device (SPD) such as a thermal metal oxide varistor (TMOV). The novel flat spring 100 consists of a first terminal or contact lead 102 with circular opening 104 at one end and a second terminal or solder-side terminal 118 having a circular opening 120 at its other end, with the opening 104 being larger than the opening 120. The first terminal (contact lead) 102 has two portions 102*a* and 102*b*, disposed in a substantially L-shape to one another, with the two portions being flat surfaces in the same plane. Portion 102*a* is disposed in a first direction while portion 102*b* is disposed orthogonally thereto, with a bend or elbow 106 therebetween. Disposed at opposing sides of the portion 102*b* are sawtooth features 108*a* and 108*b*.

The next section 126 of the novel flat spring 100 is a multi-part section consisting of join region 124, region 114, V-shaped protrusion 110, region 116, and the solder-side terminal 118. The multi-part section 126 is orthogonal to the second portion 102*b* and is parallel to the first portion 102*a* of the contact lead 102. The join region 124 is a thin, flat portion lying flush against the second portion 102*b* of the contact lead 102 and forming a bend 122. The join region 124 lies in the same plane as the contact lead 102. A small protrusion 112, formed at the mating point of the second portion 102*b* and the join region 124, is adjacent to the second sawtooth portion 108*b*. The region 114 is flush against the join region 124 but the two regions are not planar.

Connected between the region 114 and a region 116 is the V-shaped protrusion 110 having first side 128, bottom portion 130, and second side 132. The first side 128 is connected to the region 114 and the second side 132 is connected to the region 116. The region 116 is connected to the solder-side terminal 118. As will be shown, the bottom portion 130 has a first depth, and the solder-side terminal 118 has a second depth, with the first depth being lower than the second depth.

The novel flat spring 100 is designed to be part of an SPD such as a TMOV, with the contact lead 102 being one of two terminals of the TMOV. Once the novel flat spring 100 is part of the SPD, the contact lead 102 is welded or soldered to the electrical circuit/system being protected. Before describing the novel flat spring 100 in more detail, a prior art flat spring is introduced.

Figure 2:
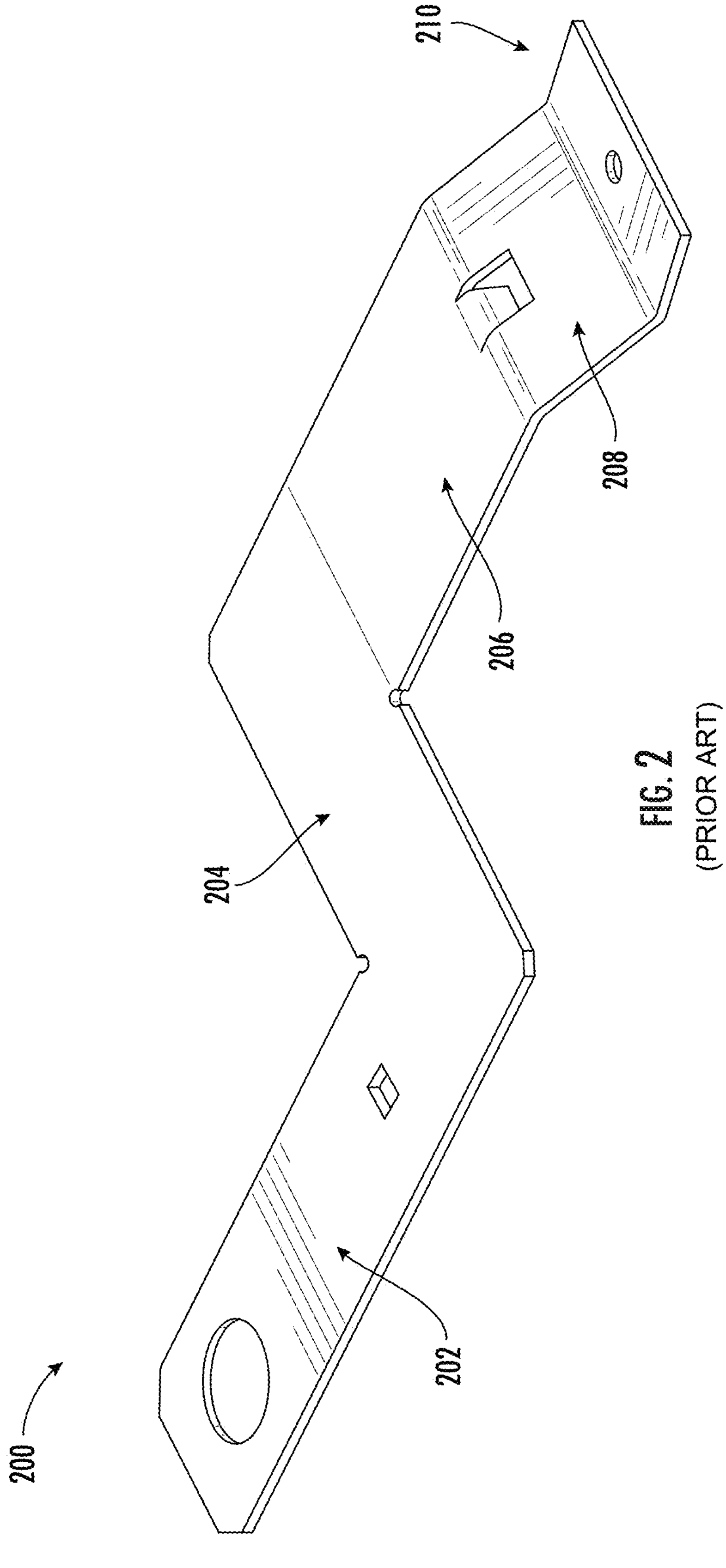
FIG. 2 (PRIOR ART)
FIG. 2 is a diagram illustrating a flat spring, in accordance with the prior art.

FIG. 2 is a representative drawings of a flat spring 200, according to the prior art. The prior art flat spring 200 features first and second terminals 202 and 210, with regions 204 and 206 therebetween. The terminal 202 is orthogonal to the region 204 and parallel to the region 206. There is a region 208 that is not planar with the region 206. A common problem with the prior art flat spring 200 is that, when part of an SPD housing, an arc shield slider of the SPD is blocked by the flat spring during the tripping process.

As solder paste will inevitably attach to two solder sides when weldments depart from each other, the triggered flat spring 200 will have residual solder paste attached in all soldered products. Once the arc shield slider in the SPD is blocked, the arc shielding function will not work and the SPD is likely to experience an insulation flashover accident. This problem may result in the SPD or TMOV catching fire. Further, the alarm system which is supposed to be triggered by the arc shield slider becomes disabled.

Figure 3A:
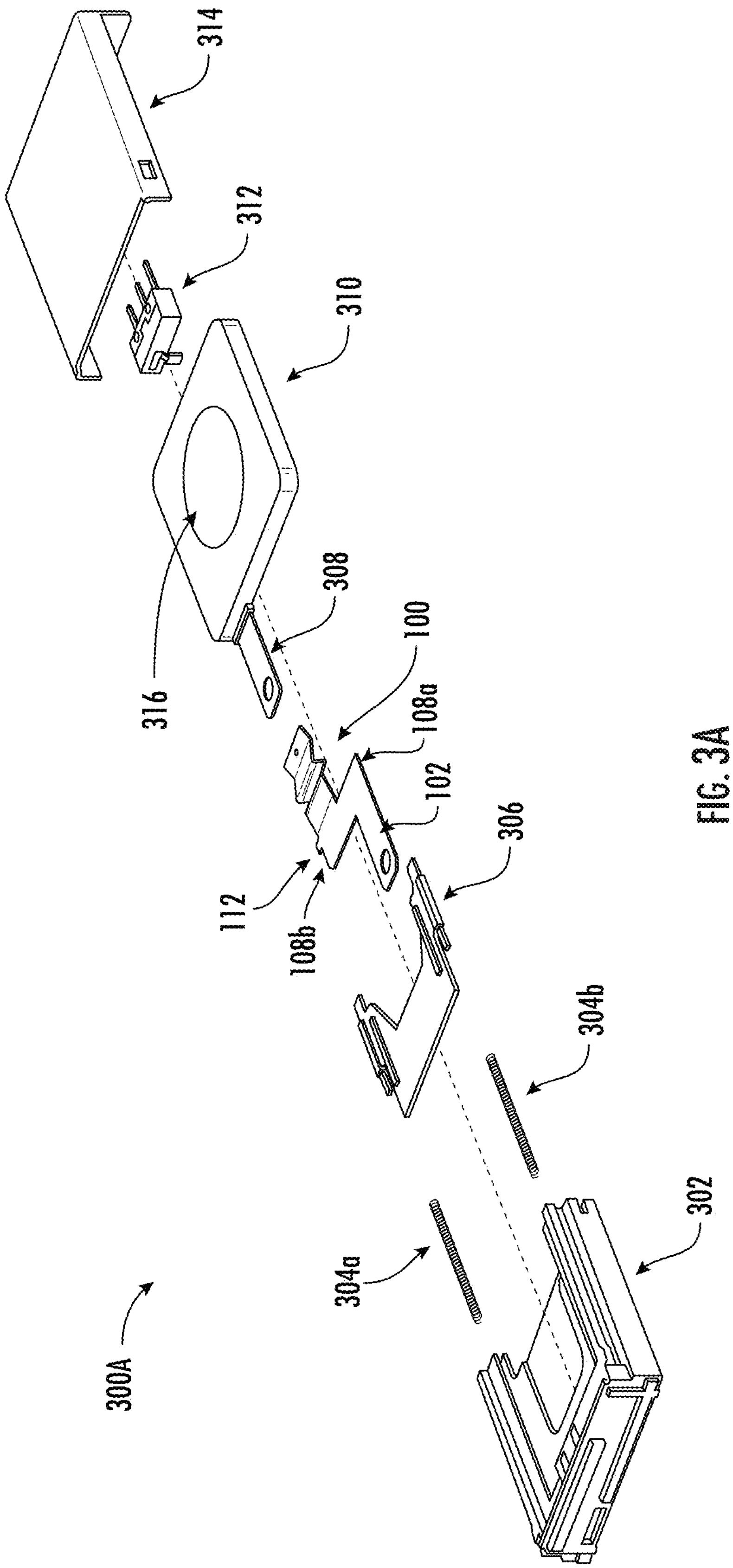
FIGS. 3A and 3B are exploded and cutaway views, respectively, of an SPD assembly including the flat spring with V-shaped protrusion of FIG. 1, in accordance with exemplary embodiments.
Figure 3B:
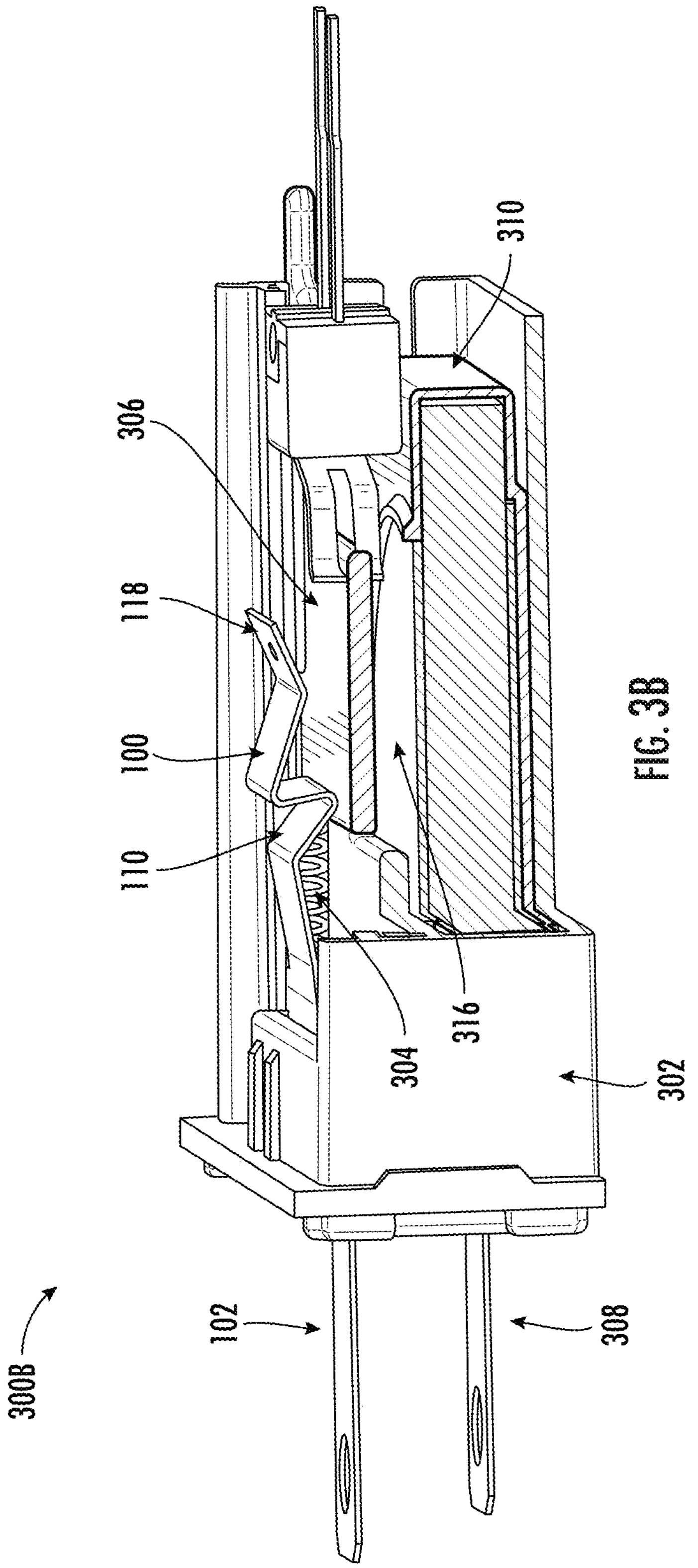

FIGS. 3A and 3B are exploded 300A and cutaway 300B views, respectively, of an SPD assembly including the novel flat spring 100 of FIG. 1, according to exemplary embodiments. Starting with the exploded view 300A, the SPD assembly includes an inner housing 302, two springs 304*a* and 304*b* (collectively, "springs 304"), an arc shield 306, the novel flat spring 100, an MOV 310, a microswitch 312, and outer housing 314. The MOV 310, which may be epoxy coated, includes a round electrode 316 and a contact lead 308.

The arc shield 306 is inserted into receiving slots of the inner housing 302 of the SPD assembly, with the springs 304 disposed therebetween and creating tension against the arc shield. The arc shield 306 and springs are arranged in the inner housing 302 to be able to slide back and forth. The arc shield 306 is thus the "slider" portion of the SPD assembly. As the name implies, the arc shield 306 is designed to move over and thus protect the MOV 310 from an electrical arc during an overvoltage event. During normal operation, the arc shield 306 is inserted into the inner housing 302 and remains flush against the springs 304. But, during an overcurrent event, the arc shield 306 moves to protect the MOV 310 from an electrical arc, which would otherwise damage or destroy the MOV.

The contact lead 308 is connected, such as by welding, to the MOV 310, with the contact lead 102 of the novel flat spring 100 being the other contact lead of the MOV. Both the contact lead 308 and the contact lead 102 (also known as terminals) will be welded to the electrical circuit being protected, such as to a bus bar. The novel flat spring 100 is disposed in a plane above the arc shield 306 with the arc shield being in a plane above the MOV 310.

The cutaway view 300B shows the SPD assembly following an overvoltage event, with the arc shield 306 being fully released from its initial position against one edge (the left side) of the SPD housing so as to be disposed over the electrode 316 of the MOV 310. The novel flat spring 100 is disposed in a plane over the arc shield 306, which is itself disposed in a plane over the MOV 310 in the housing 302. One of the two springs 304 is also visible, as is the electrode 316 of the MOV 310. The contact lead 102 of the novel flat spring 100 and the contact lead 308 of the MOV 310 extend outside the housing 302 and are to be welded to the circuit/system being protected prior to operation.

In contrast to the prior art flat spring 200 (FIG. 2), the V-shaped protrusion 110 of the novel flat spring 100 enables the arc shield 306 to maintain contact with the novel flat spring and very quickly push the V-shaped protrusion of the novel flat spring during an overvoltage event. Further, although there is contact between the V-shaped protrusion 110 and the arc shield 306, the V-shaped protrusion 110 of the novel flat spring 100 will not block the arc shield sliding operation, enabling the arc shield 306 to move as designed when the overvoltage condition occurs. This is true even though the novel flat spring 100 may still have some attached solder paste on the solder-side terminal 118.

Figure 4A:
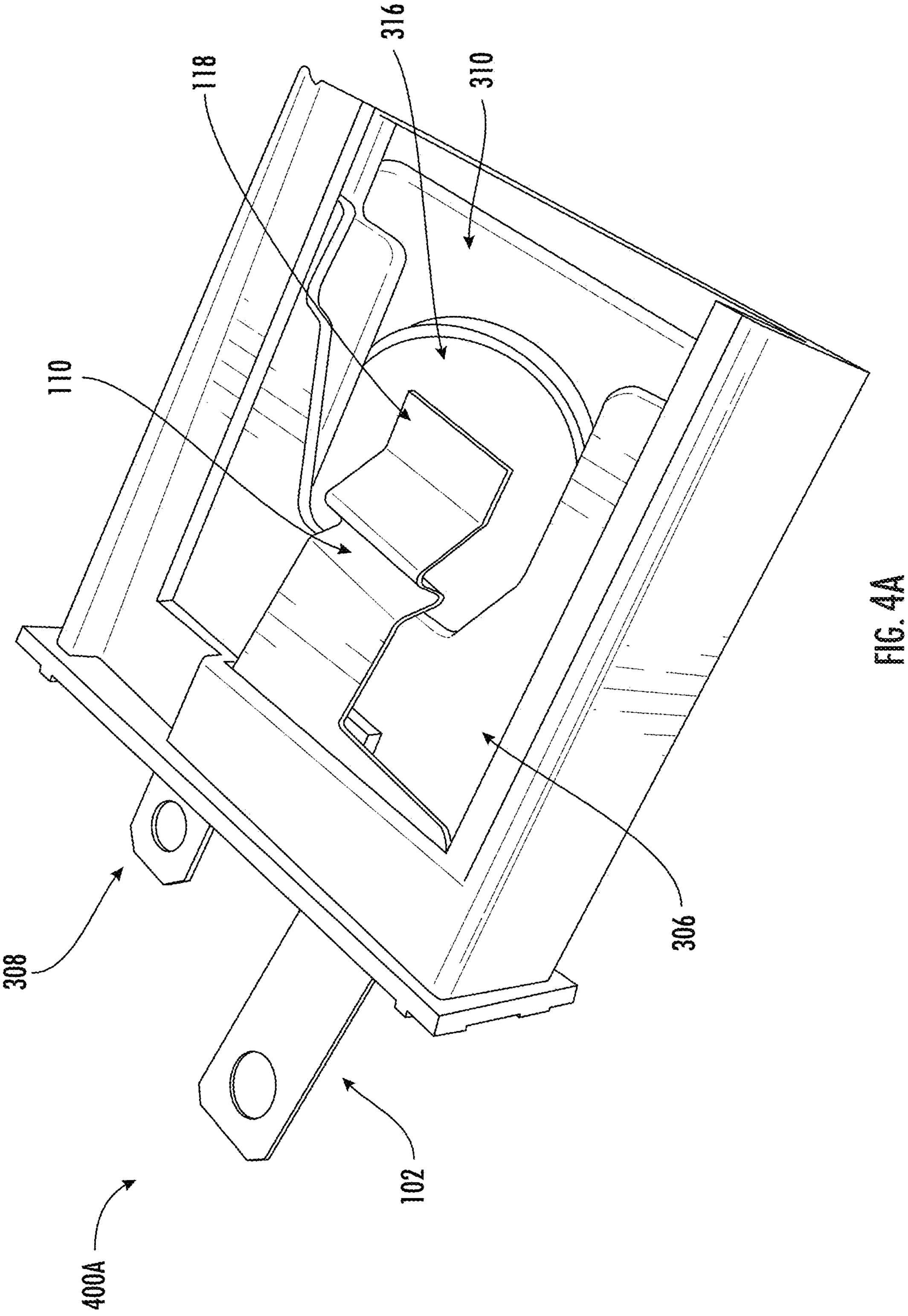
FIGS. 4A-4C are diagrams illustrating SPD assemblies including the novel flat spring of FIG. 1, before, during, and after an overvoltage event, respectively, in accordance with exemplary embodiments.
Figure 4B:
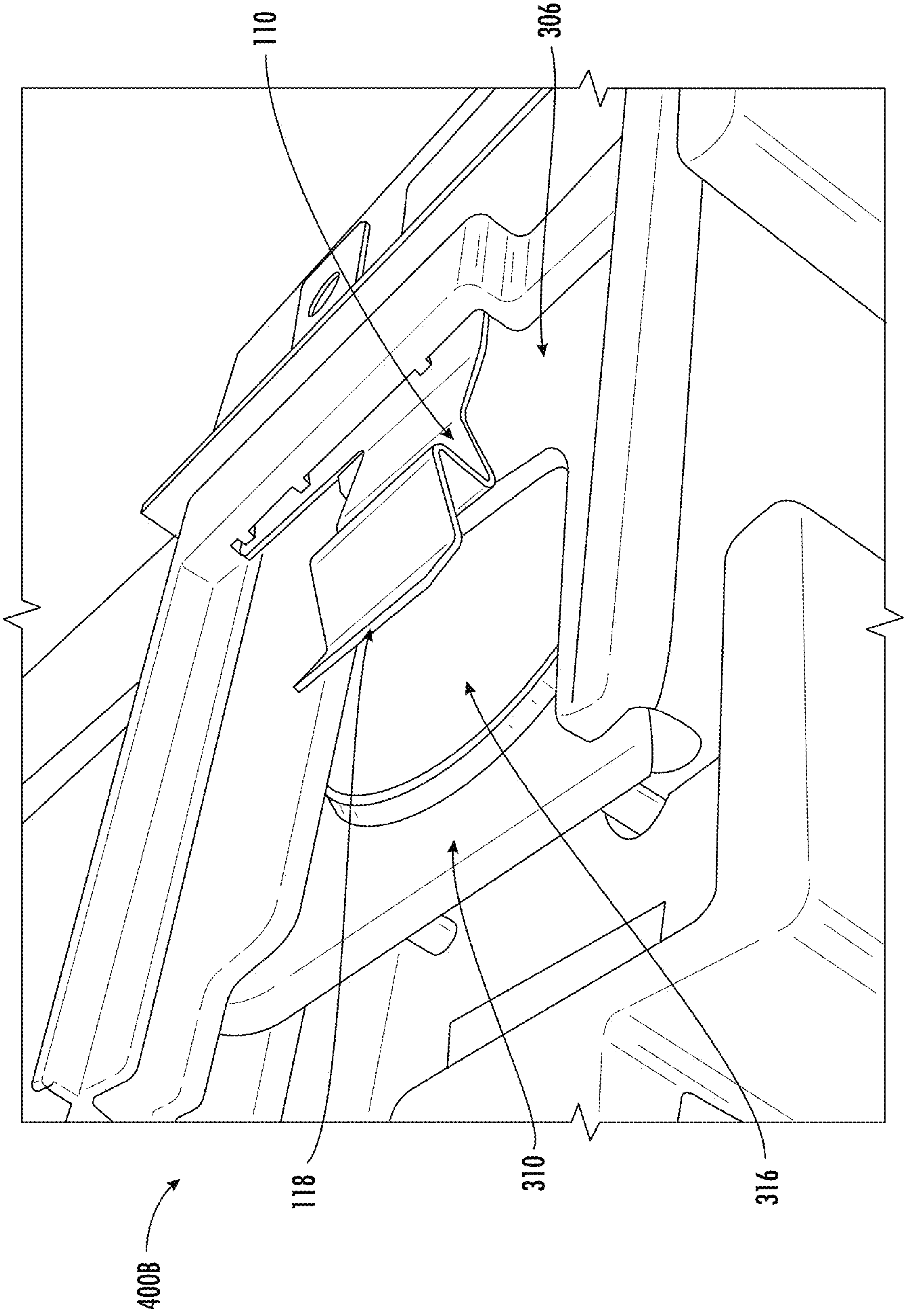
Figure 4C:
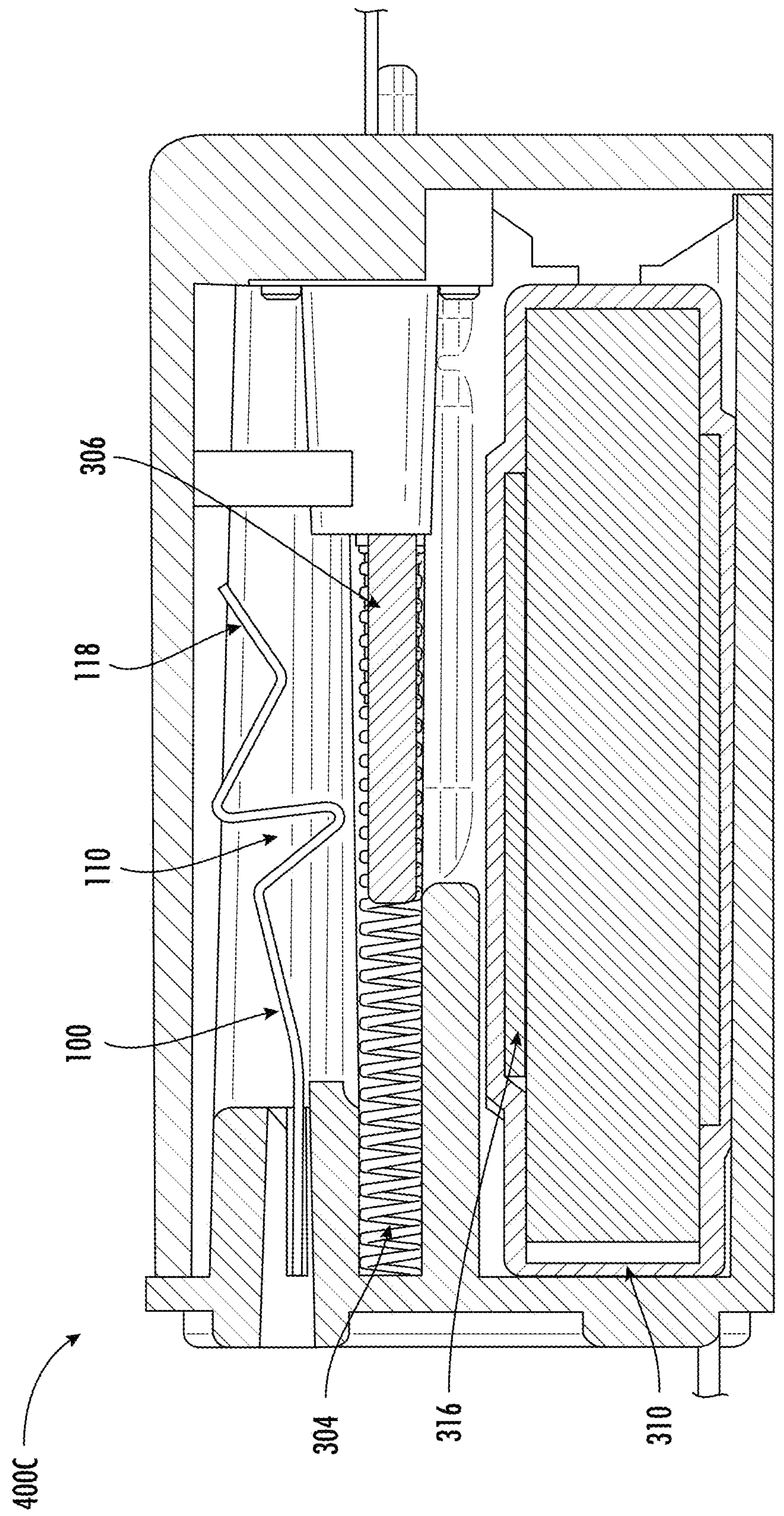

FIGS. 4A-4C provide views 400A-400C of an SPD assembly including the novel flat spring 100 of FIG. 1, according to exemplary embodiments. The view 400A shows the SPD assembly before an overvoltage event; the view 400B shows the SPD assembly during an overvoltage event; and the view 400C shows the SPD assembly following an overvoltage event.

In this view 400A, the solder-side terminal 118 of the novel flat spring 100 is soldered to the electrode 316 of the MOV 310. During the assembly process, the solder paste is placed between the solder-side terminal 118 and the electrode 316 of the MOV 310. After reflow soldering, the solder paste will turn into a solid, thus forming an electrical connection between the novel flat spring 100 and the electrode 316 of the MOV 310. When an overvoltage condition occurs, the solder will melt due to overheating caused by the overvoltage, thus breaking the connection between the novel flat spring 100 and the electrode 316.

In the view 400A, the V-shaped protrusion 110 of the novel flat spring 100 is "in front of" or "to the right of" the arc shield 306, with the arc shield being to the left side of the assembly. Thus, the arc shield 306 is not disposed directly over or above the electrode 316 of the MOV 310. By contrast, the view 300B of FIG. 3B shows the arc shield 306 directly over the electrode 316 of the MOV 310, with the V-shaped protrusion 110 being above the arc shield. The view 300B thus shows the SPD assembly during an overvoltage event.

In the view 400B, the solder-side terminal 118 is no longer connected to the electrode 316 of the MOV 310. Thus, an open circuit is formed and the MOV is thus protected from catching fire during the overvoltage event. This is because the solder has melted during the overvoltage event, separating the novel flat spring 100 from the electrode 316. Once the solder-side terminal 118 is no longer coupled to the electrode 316, the springs 304 of the arc shield 306 push the arc shield over the electrode 316 (in a leftward direction in the view 400B), with the arc shield pushing the V-shaped protrusion 110, which further pushes the solder-side terminal upward.

In some embodiments, the soldering material used to electrically connect the solder-side terminal 118 to the electrode 316 of the MOV 310 has a low melting point, relative to the other components of the SPD assembly. Thus, the solder will melt before an electrical arc is able to catch the MOV on fire. In one embodiment, the solder material is Sn42Bi58 with a melting point of 138 degrees Celsius. In another embodiment, the solder material is Sn99.3Cu0.7, with a melting point of 217 degrees Celsius. In another embodiment, the solder material is SnAG3.0Cu0.5 with a melting point of 217 degrees Celsius. Other soldering materials may be used as well, as long as the melting point is set so that the solder melts first, before other materials of the SPD assembly.

In the side cutaway view 400C, the arc shield 306 has been fully engaged following an overvoltage event, so as to be disposed above the electrode 316 of the MOV 310. The V-shaped protrusion of the novel flat spring 100 is above the arc shield 306 and does not impede its movement, in this view, leftward over the MOV 310. FIG. 3B also shows the position of the arc shield over the electrode 316 of the MOV 310 following an overvoltage event.

Returning to FIG. 4A, in the view 400A before the overvoltage event occurs, the V-shaped protrusion 110 is disposed between the solder-side terminal 118 of the novel flat spring 100 and the arc shield 306. The depth of the V-shaped protrusion 110 is lower than the solder-side terminal 118 so that the sliding action of the arc shield 306 can avoid getting blocked by residual solder paste attached on the face of the electrode 316. Because the solder-side terminal 118 of the novel flat spring 100 is higher than the bottom surface of the V-shaped protrusion, this ensures that the arc shield 306 will not be blocked in the tripping process.

The sawtooth features 108 and the protrusion 112 introduced in FIG. 1 of the novel flat spring 100 are shown in the exploded view 300A (FIG. 3A). The sawtooth features 108 are at both edges of the portion 102*b* of the novel flat spring 100 (FIG. 1) and provide reliability during mechanical movement of the flat spring. The sawtooth features 108 and the protrusion 112 facilitate attachment of the novel flat spring 100 into the inner housing 302 of the SPD assembly 300. The inner housing 302 includes respective receiving edges/openings (not shown) to ensure that the novel flat spring 100, once attached into the housing, remains fixably in place. The sawtooth edges 108 and protrusion 112 thus provide additional reliability in the complex environment of the SPD assembly.

In some embodiments, the minimum gap between the solder-side terminal 118 of the novel flat spring 100 and the arc shield 306 is 0.2 mm or more. In an exemplary embodiment, the minimum gap between the solder-side terminal 118 and the arc shield 306 is 1.49 mm. This space ensures that the arc shield 306 will not be blocked by residual soldering material in the tripping process.

Figure 5:
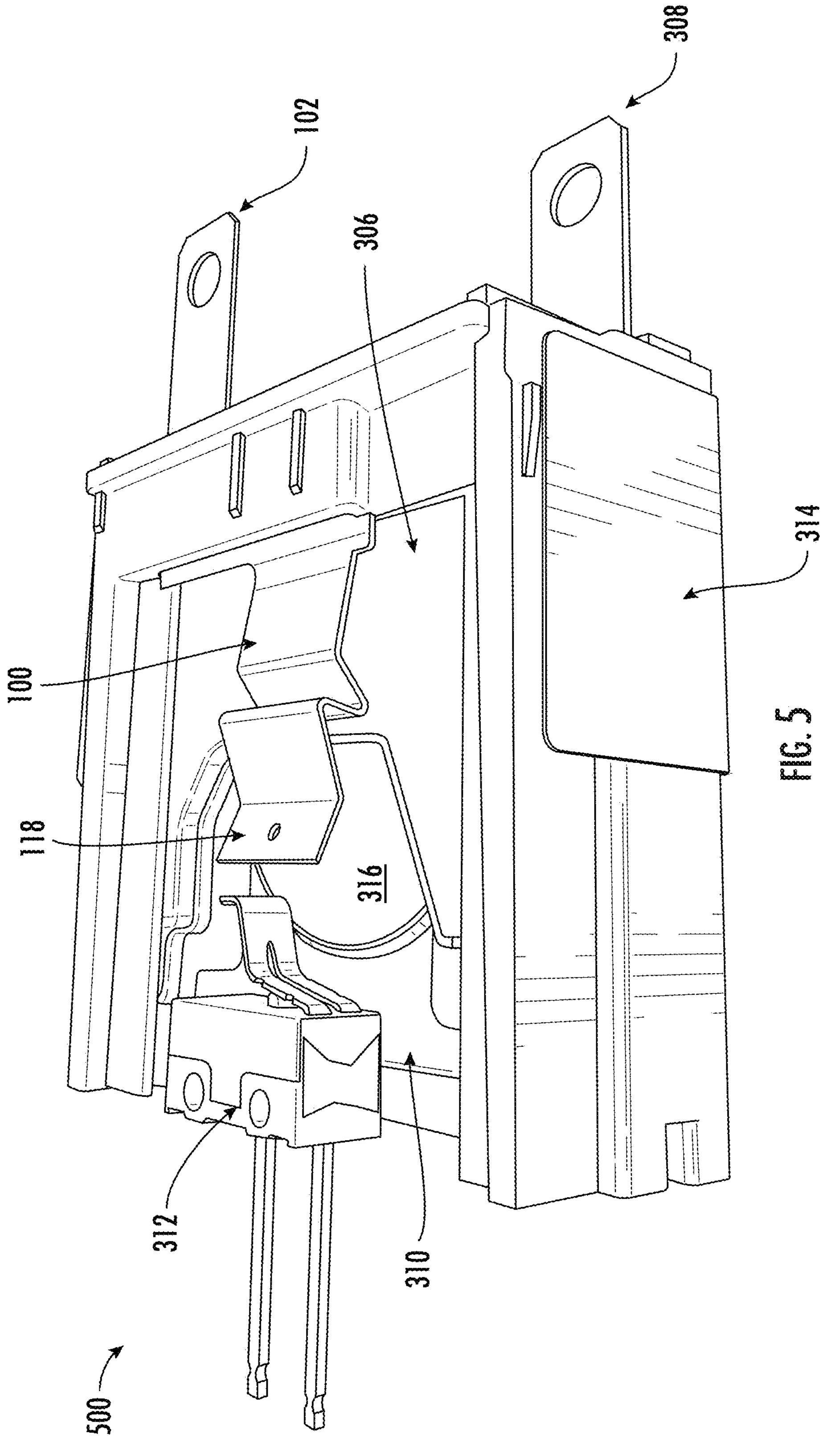
FIG. 5 is a diagram of an SPD assembly including the flat spring with V-shaped protrusion of FIG. 1, in accordance with exemplary embodiments.

FIG. 5 shows another view 500 of an SPD assembly including the novel flat spring 100 of FIG. 1, according to exemplary embodiments. The first terminal or contact lead 102 that is part of the novel flat spring 100 and the second terminal or contact lead 308 that is welded to the MOV 310 (FIG. 3A) are shown extending to the right of the outer housing 314. The arc shield 306 is disposed in a plane above the MOV 310 while the novel flat spring 100 is disposed in a plane above the arc shield. The microswitch 316 is also visible on the left side of the housing 314. The solder-side terminal 118 of the novel flat spring 100 is disposed over the electrode 316 of the MOV 310. In this view 500, an overvoltage event has commenced, and the solder has melted such that the solder-side terminal 118 is no longer electrically coupled to the electrode 316 of the MOV 310. The arc shield 306 has partially moved over the electrode it is designed to protect.

Figure 6A:
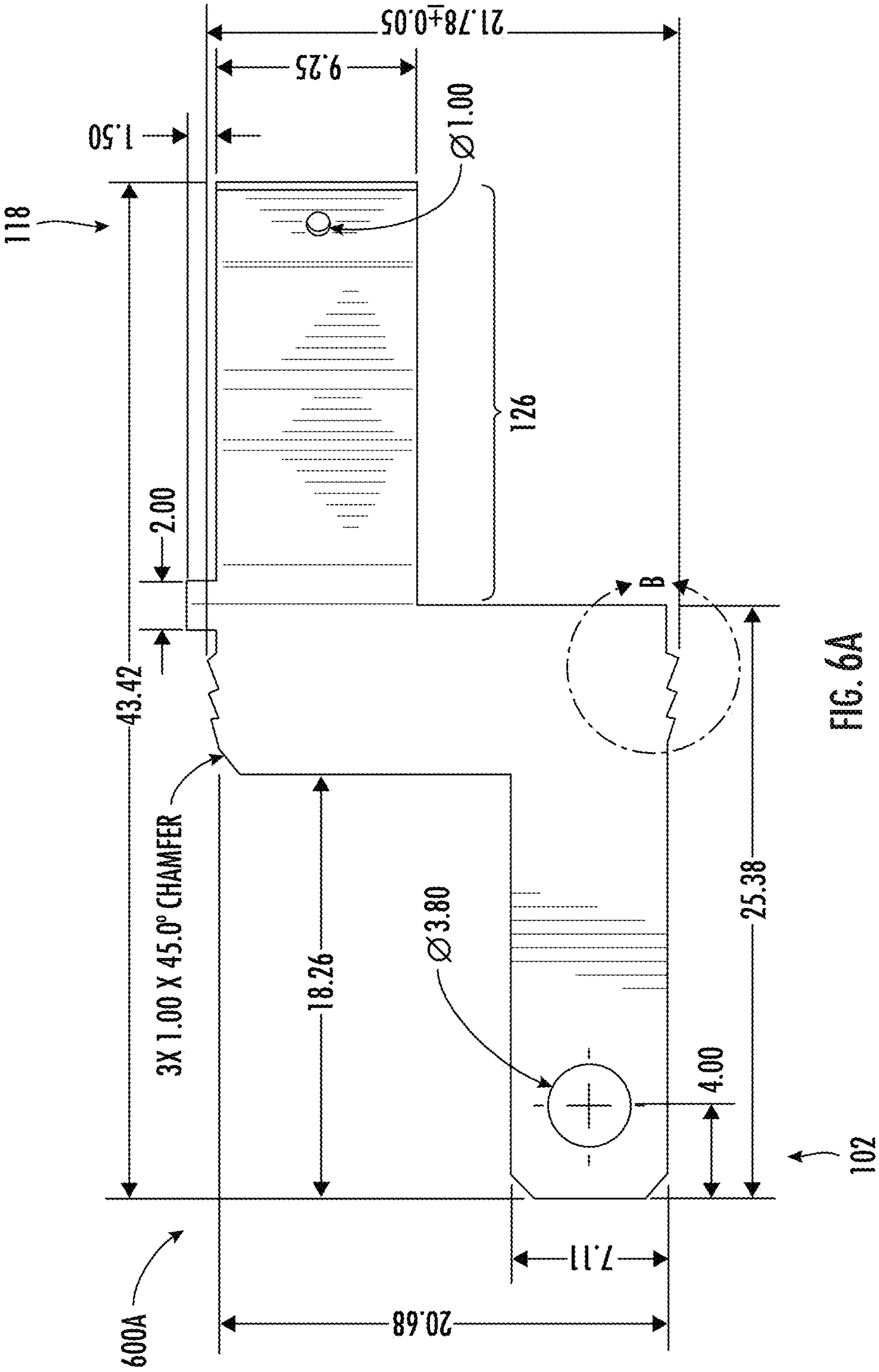
FIGS. 6A-6C are technical views of the flat spring with V-shaped protrusion of FIG. 1, in accordance with exemplary embodiments.
Figure 6B:
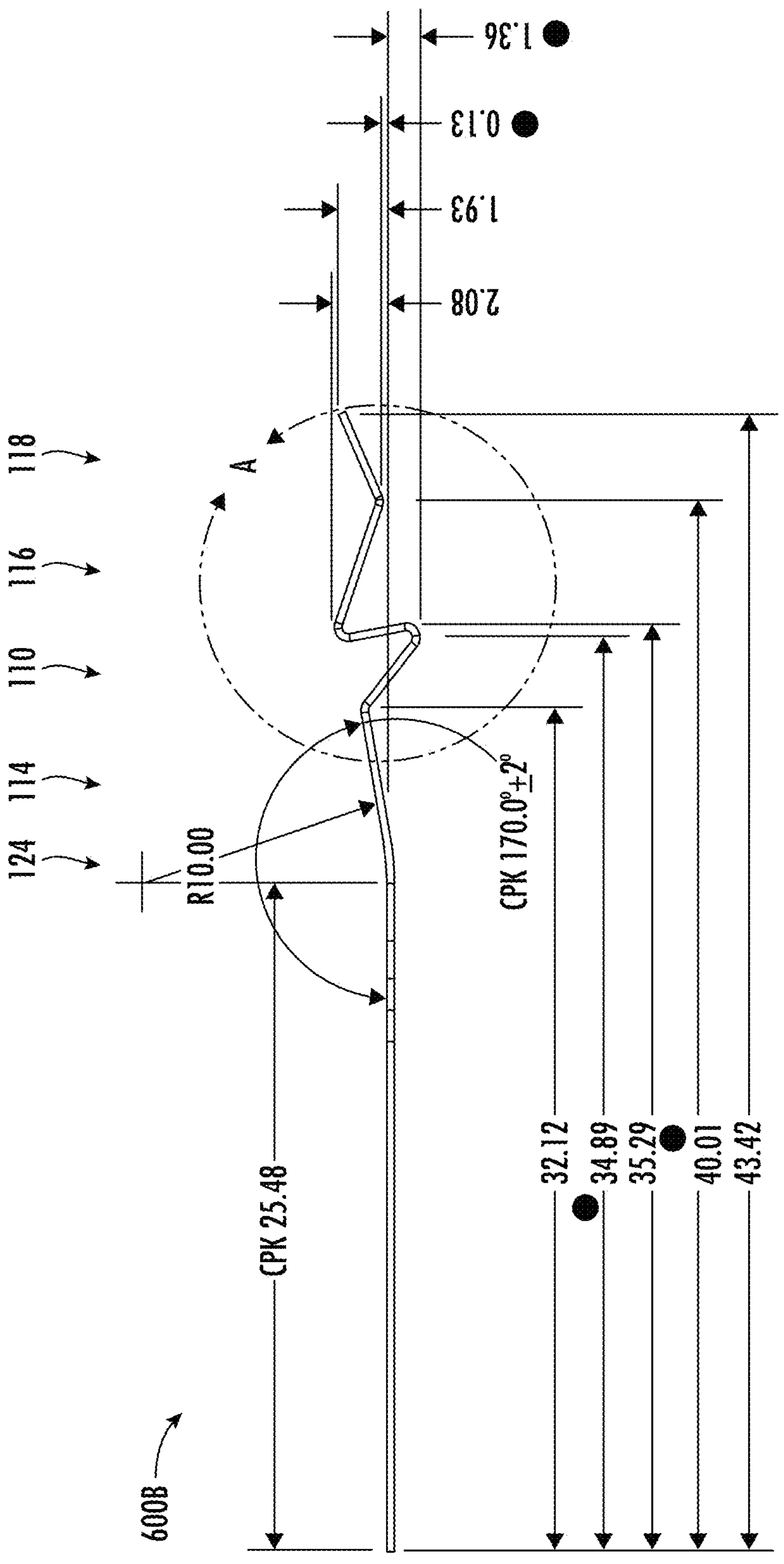
Figure 6C:
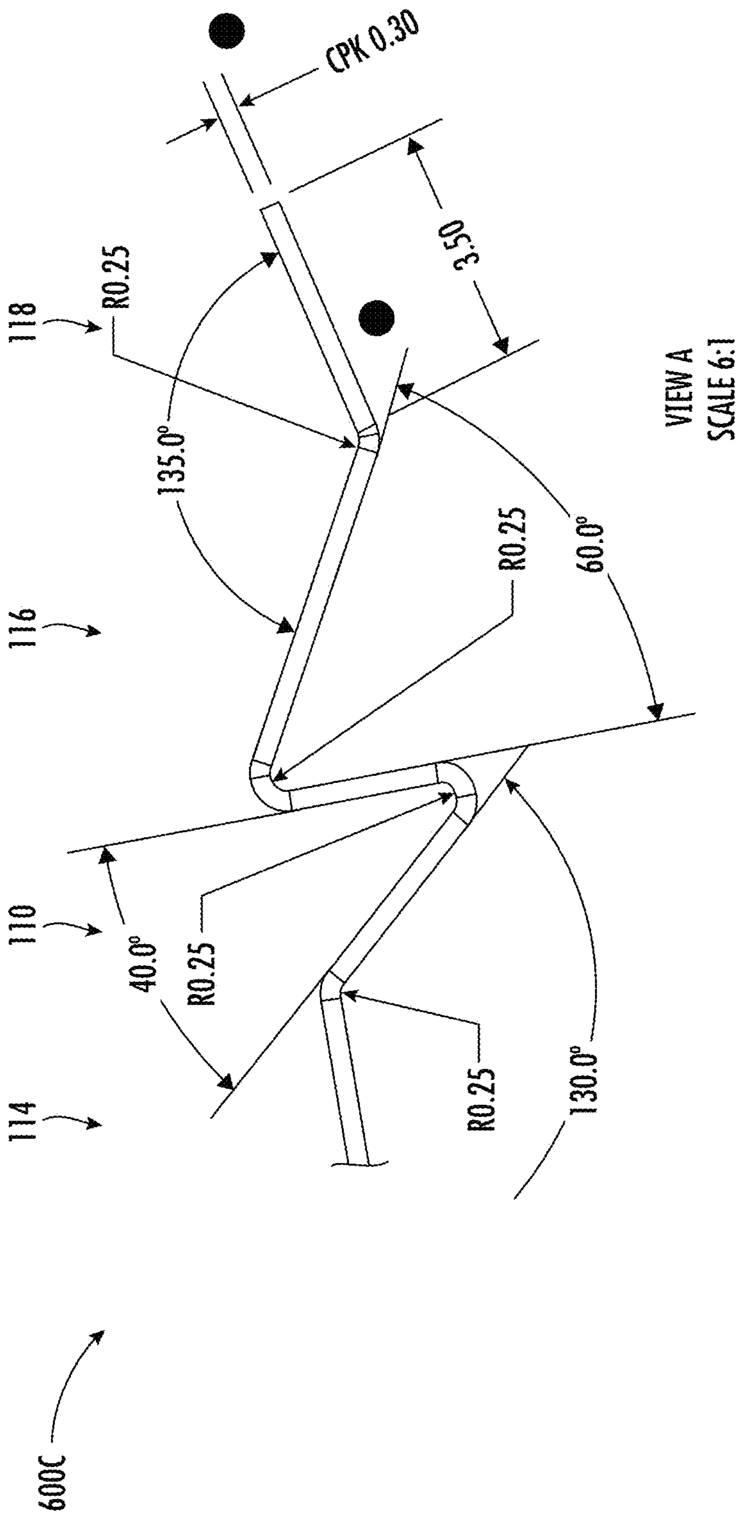

FIGS. 6A-6C are technical drawings of the novel flat spring 100, according to exemplary embodiments. The measurements are given in millimeters (mm). For example, FIG. 6A shows that the width of the first terminal or contact lead 102 is 7.11 mm and the width of the second solder-side terminal 118 is 9.25 mm, which is the same width as the multi-part section 126 of the novel flat spring 100. Further, in some embodiments, the length of the second solder-side terminal 118 is between 3.0 mm and 3.8 mm. In an exemplary embodiment, the length of the second solder-side terminal is 3.41 mm. FIGS. 6B and 6C show the relative angular disposition of the region 114, the V-shaped protrusion 110, the region 116, and the solder-side terminal 118. Because the solder-side terminal is higher than the bottom surface of the V-shaped protrusion, this ensures that the arc shield will not be blocked in the tripping process. In the novel flat spring 100, the solder area is neither too small to provide mechanical strength nor too big to trip fast enough to protect the MOV disk 310 from catching fire.

Thus, the novel flat spring 100 with the V-shaped protrusion 110 can address the serious problems of prior art SPDs catching fire with high reliability. The V-shaped protrusion 110 is in front of solder area of the novel flat spring 100. The depth of the V-shaped protrusion 110 is lower than the solder-side terminal so that the arc shield slider can avoid getting blocked by residual solder paste attached on the face of the weld.

The novel flat spring 100 is applicable to all kinds of solder paste and solder methods. The solder area is so precise that the novel flat spring 100 provides mechanical strength and tripping sensitivity at the same time. The V-shaped protrusion feature solves a common issue that the slider of the SPD is blocked in the tripping process. The novel flat spring 100 is easy to manufacture at a low cost and can be used with a variety of SPD modules, including TMOV devices.

Thus, in an exemplary embodiment, when an overvoltage event occurs, the following operations will occur. First, the solder between the solder-side terminal 118 and the electrode 316 will melt. Next, the two coil springs 304*a* and 304*b* (FIG. 3A) will push the arc shield 306 to move and push the V-shaped protrusion 110 of the novel flat spring 100. In turn, this will cause the solder-side terminal 118 to move upward, thus causing an open circuit. The V-shaped protrusion of the novel flat spring 100 thus provides mechanical strength to force the open circuit. The novel flat spring 100 also enhances/improves the tripping sensitivity of the SPD module, which protects the valuable MOV inside.

In exemplary embodiments, the SPDs described herein with the novel flat spring 100 are useable in an MOV with an ultra-fast activation thermal fuse. No additional overcurrent fuse is needed, with the SPD satisfying UL 1449 Type 1 and 2 applications. The SPD with the novel flat spring 100 further is able to safely and quickly form an open circuit covering a very wide range. In some embodiments, the range is from 0.125 A~200 kA, which is suitable to protect a variety of different kinds of circuits.

As used herein, an element or step recited in the singular and proceeded with the word “a” or “an” should be understood as not excluding plural elements or steps, unless such exclusion is explicitly recited. Furthermore, references to “one embodiment” of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A flat spring for use in a surge protection device (SPD), the flat spring comprising:

a first terminal comprising a substantially L-shape in a first plane, the first terminal comprising a first portion and a second portion, wherein the second portion is orthogonal to the first portion;

a multi-part section coupled to the second portion of the first terminal, the multi-part section being orthogonal to the second portion and parallel to the first portion, the multi-part section further comprising:

a V-shaped protrusion having a first side, a second side, and a bottom region, the bottom region being at a first depth; and a solder-side terminal being at a second depth;

wherein the first depth is lower than the second depth.

2. The flat spring of claim 1, the multi-part section further comprising:

a join region coupled to the first terminal and in the first plane;

a region coupled to the first side of the V-shaped protrusion and in a second plane; and a second region coupled to the second side of the V-shaped protrusion and in a third plane, wherein the second region is also coupled to the solder-side terminal.

3. The flat spring of claim 2, further comprising first and second sawtooth regions disposed on opposing sides of the second portion of the first terminal.

4. The flat spring of claim 3, further comprising a protrusion formed at a mating point between the second portion of the first terminal and the join region, wherein the protrusion and the first and second sawtooth regions mate the flat spring within a housing of the SPD.

5. The flat spring of claim 4, characterized in that, along with a second terminal of a metal oxide varistor (MOV) disposed within the housing of the SPD, the first terminal is used to establish an electrical connection to a circuit being protected by the SPD.

6. The flat spring of claim 5, characterized in that the solder-side terminal is soldered to an electrode of the MOV.

7. The flat spring of claim 1, characterized in that the solder-side terminal is between 8 and 10 mm long by between 3 and 4 mm wide.

8. The flat spring of claim 1, characterized in that the width of the first terminal is between 6 and 8 mm.

9. A surge protection device (SPD) comprising:

a metal oxide varistor (MOV) comprising a first terminal;

a pair of springs;

an arc shield to be disposed over the MOV, the arc shield to abut against the pair of springs when slid into a housing of the SPD; and a flat spring to be slid into the housing above the arc shield, the flat spring comprising:

a second terminal comprising a substantially L-shape in a first plane;

a multi-part section coupled to the second terminal, the multi-part section further comprising:

a V-shaped protrusion having a first side, a second side, and a bottom region, the bottom region being at a first depth; and a solder-side terminal being at a second depth, wherein the first depth is lower than the second depth.

10. The SPD of claim 9, the MOV further comprising an electrode, wherein the solder-side terminal is soldered to the electrode.

11. The SPD of claim 10, characterized in that the first terminal and the second terminal are electrically coupled to a circuit to be protected by the SPD.

12. The SPD of claim 10, characterized in that the second terminal of the flat spring comprises a substantially L-shape in a first plane, the second terminal comprising a first portion and a second portion, wherein the second portion is orthogonal to the first portion.

13. The SPD of claim 11, the flat spring further comprising a multi-part section comprising:

a join region coupled to the second terminal and in the first plane;

a region coupled to the first side of the V-shaped protrusion and in a second plane; and a second region coupled to the second side of the V-shaped protrusion and in a third plane, wherein the second region is also coupled to the solder-side terminal.

14. The SPD of claim 12, characterized in that the multi-part section is orthogonal to the second portion and parallel to the first portion.

15. The SPD of claim 13, the flat spring further comprising first and second sawtooth regions disposed on opposing sides of the second portion of the second terminal.

16. The SPD of claim 9, characterized in that a minimum gap between the solder-side terminal and the arch shield is at least 0.2 mm.

17. The SPD of claim 9, characterized in that the solder-side terminal is between 8 and 10 mm long by between 3 and 4 mm wide.

18. The SPD of claim 9, characterized in that the width of the second terminal is between 6 and 8 mm.

19. The SPD of claim 9, characterized in that the flat spring does not block movement of the arc shield during an overvoltage event.

20. The SPD of claim 9, characterized in that the arc shield moves the V-shaped protrusion of the flat spring during an overvoltage event.

* * * * *